Patented Aug. 9, 1949

UNITED STATES PATENT OFFICE 2,478,377

2,478,377

PREPARATION OF ESTERS OF ACIDS OF PHOSPHORUS

Joseph B. Dickey, Rochester, N. Y., and James G. McNally, Oak Ridge, Tenn., assignors to Eastman Kodak Company, Rochester, N. Y., a corporation of New Jersey No Drawing. Application June 29, 1945, Serial No. 602,413

4 Claims. (Cl. 260—461)

This invention relates to the preparation of hitherto unknown esters of the acids of phosphorus and more particularly to the preparation of phosphated and phosphited compounds derived from unsaturated ethers.

This invention has as its object to provide a process for producing certain new chemical compounds which are esters of acids of phosphorus. A further object is to provide new phosphated and phosphited compounds which are esters prepared from blown unsaturated ethers. A still further object is to provide improved phosphated and phosphited compounds having exceptional usefulness as surface-active agents, wetting, washing, and dispersing agents, and as lubricating, anti-static and conditioning agents for textile yarns, particularly those composed of or containing cellulose acetate and related cellulose derivatives. Other objects will appear hereinafter.

These objects are accomplished by the following invention, which is based upon the unexpected discovery that if certain linear ethers derived from unsaturated alcohols containing the group

are heated and then blown with air or oxygen until an appreciable increase in specific gravity of the compounds occurs, such compounds will react with acids of phosphorus such as phosphorous, hypophosphorous, phosphoric, thiophosphoric, and the various pyro- and polyphosphorous and phosphoric acids. This is a most unusual phenomenon when it is taken into consideration that compounds containing the group

such as oleic acid, butyl oleate, oleyl alcohol, carbitol oleate, ethylene glycol dioleate, and butyl ricinoleate, oleyl ether, allyl oleyl ether, and ethylene glycol dioleyl ether, do not add acids of phosphorus, such as phosphorous and phosphoric acids when mixed and heated therewith.

While we do not confine ourselves to any specific theory or explanation of the mechanism of the reaction involved when the unsaturated compounds are blown as above described, the reaction may be as follows:

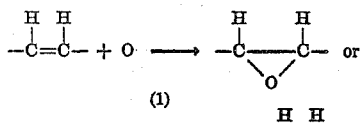

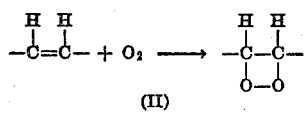

The reaction between the phosphorus acid and the structure resulting from the blowing operation may be represented conventionally as follows:

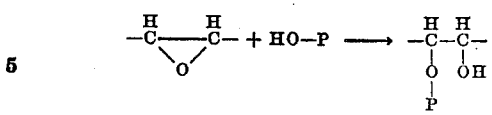

It will thus be seen that the phosphato or phosphito group adds to the carbon chain at the position originally occupied, before blowing, by an unsaturated linkage.

In general, the unsaturated compounds selected for blowing such as dioleyl ether, ethylene glycol, dioleyl ether, diricinoleyl ether, propane-1,2,3-tricrotyl ether, sorbitol dioleyl, diallyl ether, dioxane dioleyl ether, etc., are heated from 50° to 200° C. (125–180° C. preferred) and air or oxygen is passed in until a product having the desired properties is obtained. When the unsaturated compound is blown the iodine value and saponification equivalent rise. One skilled in the art can, by following the progress of the above constants, determine when to stop blowing the unsaturated compound so as to obtain a product that will readily react with an acid of phosphorus.

Any of the -ous and -ic acids of phosphorus may be employed for phosphating or phosphiting the blown compounds in accordance with our invention. Typical examples of such acids are phosphoric acid, metaphosphoric acid, monosodium phosphate, pyrophosphoric acid, tetraphosphoric acid, phosphorous acid, hypophosphorous acid and pyrophosphorous acid.

In view of the foregoing explanation the compounds of our invention may then be regarded as esters of acids of phosphorus prepared by reacting an -ous or -ic acid of phosphorus with a blown unsaturated ether. Among the unsaturated ethers which can be used in practicing our invention are those having the following formulas:

R—O—R and R'(OR)$_n$ wherein R is an olefinically unsaturated hydrocarbon chain having 3 to 25 carbon atoms, R' is a low carbon atom saturated hydrocarbon radical, and $n$ is a number from 2 to 3.

In the following examples and description, we have set forth several of the preferred embodiments of our invention, but they are included merely for purposes of illustration and not as a limitation thereof.

Example 1

100 grams of dioleyl ether is blown with air at 160° C. using copper naphthenate as a catalyst. When the specific gravity of the material has increased 0.07-unit 50 grams of phosphoric acid are added, the reaction mixture is heated on a steam bath for 12 hours. The excess acid is removed by washing with water. The heavy viscous phosphated product that results is water soluble.

Example 2

100 grams of ethylene glycol diricinoleyl ether is blown as in Example 1 and reacted with 60 grams of phosphorous acid at 100° as above. The heavy viscous product is washed with water. The resulting phosphorous acid ester is water soluble.

Example 3

100 grams of propane-1,2,3,-tricrotyl ether is blown as in Example 1 until the specific gravity has increased 0.05-unit and then reacted with 50 grams tetraphosphoric acid as in the examples above. The excess acid is removed by washing with cold aqueous salt solution. The product is soluble in water.

Example 4

100 grams of tetrahydrofurfurylerucyl ether are blown as previously described until the specific gravity of the oil has increased 0.04-unit and reacted with a 1:1 mixture of phosphoric acid and pyrophosphoric acid. The product is worked up as above.

While we have found it convenient to illustrate our invention by reference to procedures involving the blowing of certain specific unsaturated ethers, it will be evident that many modifications in such procedures may be made within the scope of our invention. In general, it may be said that irrespective of the particular ether dealt with, the blowing operation may be carried out in a manner strictly analogous to that which has been employed in the blowing of various oils, fats, and waxes for many years.

The compounds of our invention have many valuable applications in industry. For example, they may be employed as surface-active agents, wetting, washing and dispersing agents. We have found them to have outstanding properties when employed as lubricating anti-static and conditioning agents for textile yarns, particularly those composed of or containing cellulose acetate and related cellulose derivatives.

What we claim is:

1. The process of producing an ester of an acid of phosphorus which comprises blowing an unsaturated ether selected from those having the following formulas:

R—O—R and R'—(OR)$n$ wherein R is an unsaturated hydrocarbon chain of 3 to 25 carbon atoms in which the unsaturation is limited to olefinic unsaturation and R' is a low carbon atom saturated hydrocarbon radical, and $n$ is a number from 2 to 3, at from 50° to 200° C., until an appreciable increase in specific gravity occurs, and thereafter treating the blown ether with an acid of phosphorus selected from the group consisting of phosphorous, phosphoric, pyrophosphoric and tetraphosphoric acids.

2. The process of producing an ester of an acid of phosphorus which comprises blowing dioleyl ether, at from 50° to 200° C., until an appreciable increase in specific gravity occurs, and thereafter treating the blown ether with phosphoric acid.

3. The process of producing an ester of an acid of phosphorus which comprises blowing propane-1,2,3-tricrotyl ether, at from 50° to 200° C., until an appreciable increase in specific gravity occurs, and thereafter treating the blown ether with tetraphosphoric acid.

4. The process of producing an ester of an acid of phosphorus which comprises blowing tetrahydrofurfurylerucyl ether, at from 50° to 200° C., until an appreciable increase in specific gravity occurs, and thereafter treating the blown ether with a mixture of phosphoric and pyrophosphoric acids.

JOSEPH B. DICKEY.
JAMES G. McNALLY.

REFERENCES CITED

The following references are of record in the file of this patent:

UNITED STATES PATENTS

| Number | Name | Date |
|---|---|---|
| 1,944,530 | Schonburg | Jan. 23, 1934 |
| 2,185,967 | Priester | Jan. 2, 1940 |
| 2,200,299 | Robinson | May 14, 1940 |
| 2,241,244 | Conary et al. | May 6, 1941 |
| 2,260,819 | Balassa | Oct. 28, 1941 |
| 2,345,734 | Dickey et al. | Apr. 4, 1944 |
| 2,372,244 | Adams | Mar. 27, 1945 |

FOREIGN PATENTS

| Number | Country | Date |
|---|---|---|
| 452,508 | Great Britain | Aug. 24, 1936 |